United States Patent [19]

Pugsley

[11] Patent Number: 4,484,230
[45] Date of Patent: Nov. 20, 1984

[54] IMAGE REPRODUCTION METHOD AND APPARATUS

[75] Inventor: Peter C. Pugsley, Pinner, England

[73] Assignee: Crosfield Electronics Limited, London, England

[21] Appl. No.: 344,157

[22] Filed: Jan. 29, 1982

[30] Foreign Application Priority Data

Feb. 4, 1981 [GB] United Kingdom ............... 8103457

[51] Int. Cl.$^3$ .............................................. H04N 1/40
[52] U.S. Cl. .................................. 358/284; 358/167; 358/80
[58] Field of Search ............... 358/107, 106, 166, 284, 358/280, 167, 163, 80

[56] References Cited

U.S. PATENT DOCUMENTS

| | | | |
|---|---|---|---|
| 3,743,772 | 7/1973 | Pieters et al. | 358/163 |
| 3,902,011 | 8/1975 | Pieters et al. | 358/163 |
| 4,354,243 | 10/1982 | Ryan et al. | 358/163 |
| 4,355,228 | 10/1982 | Sama et al. | 358/163 |
| 4,377,820 | 3/1983 | Reitmeier | 358/163 |
| 4,389,677 | 6/1983 | Rushby et al. | 358/280 |
| 4,419,693 | 12/1983 | Wilkinson | 358/167 |

*Primary Examiner*—Howard W. Britton
*Assistant Examiner*—Edward L. Coles
*Attorney, Agent, or Firm*—Sughrue, Mion, Zinn, Macpeak & Seas

[57] ABSTRACT

In image reproduction, a method of preventing the reproduction of a defect in an area (74) of the image, which has been indicated as including a defect-containing region, comprises comparing pixel values in a region ($A_o$) of the said area outside the defect-containing region (72) to ascertain the range of the values of picture elements in a defect-free line or region in the neighborhood of the defect-containing region. Next image values for picture elements in a portion ($A_1$) of the defect-containing region are compared with the said range of values to ascertain whether any such picture element has a value differing sharply from the said range of values. Any sharply differing value is automatically replaced either by the value of a neighboring picture element in the defect-free line or region, or by the average value of a group of neighboring picture elements in the defect-free line or region, or by values having a similar mean value and similar variation to those in the neighboring defect-free region. Then the values of other picture elements in the defect-containing region are examined and those values which differ sharply from the said range of values are automatically replaced. The defect-containing region is progressively corrected in this way, preferably working from the boundary inwards ($A_1$, $A_2$, $A_3$, $A_4$) and preferably from each side (A, B, C, D) of a rectangle in turn. When all defects have been removed the stored signals are used to make the reproduction.

12 Claims, 7 Drawing Figures

IMAGE REPRODUCTION METHOD AND APPARATUS

This invention is concerned with the reproduction of images by a process involving deriving density-representing values for the picture points of an original to be reproduced. The original may be scanned by means of an analysing head including a photoelectric device from which there is derived an electric signal, the value of which at any instant depends upon the density of the point of the original which is being scanned at that instant. Such a signal may be used to control an image-reproducing device which scans an output surface using a similar scanning pattern and which may include an exposing light source (for use with a light-sensitive output surface) or may include an engraving device. To reproduce coloured images, the analysing head includes colour filters and a number of photoelectric devices so arranged that different electric signals are derived for different colour-component densities of the picture points of the original.

The original may include a defect which has to be omitted in the reproduction. In our British Pat. No. 1,334,529 we have previously proposed identifying the defect area by marking a mask which is scanned separately from the scanning of the original picture. Under the control of the mask, a computer replaces the values of defective picture elements with values derived from other picture elements, for example with repetitions of the value immediately in advance of the defective picture element in the direction of the scanning line, or with values derived from picture elements at both ends of the defect along the scanning line, or with values derived from picture elements surrounding the defective area.

Also, in our British Pat. No. 1,511,236, we have proposed that defects on the original be marked with a fluorescent paint to produce a distinguishable signal when the original is scanned. The distinguishable defect-indicating signal causes a correction generator to derive a replacement signal from neighbouring picture element values and to substitute this for the defective signal. The original thus serves as its own retouching mask.

The present invention is also concerned with a method of making a defect-free reproduction of an image; this method comprises:

storing signal values for all picture elements of the image to be reproduced;

identifying picture elements for which the signal values are defective;

and replacing the defective value of a picture element by a value derived from a neighbouring picture element or group or picture elements; and in which the replacement is effected by:

for an area of the image which has been indicated as including a defect-containing region, comparing the image values of picture elements in a region of said area outside the defect-containing region to ascertain the range of the values of picture elements in a defect-free line or region in the neighbourhood of the defect-containing region;

examining image values for picture elements in the defect-containing region by comparing them with the said range of values to ascertain whether any such picture element has a value differing sharply from the said range of values;

for any picture elements having a sharply differing value, automatically replacing the said value by the value of a neighbouring picture element in the defect-free line or region, or the average value of a group of neighbouring picture elements in the defect-free line or region, or automatically replacing the values of such picture elements by values having a similar mean value and similar variation to those in the said neighbouring defect-free region;

thereafter, examining the values of other picture elements in the defect-containing region and similarly automatically replacing those which differ sharply from the range of values in the neighbouring defect-free region until the whole of the defect-containing region has been examined;

and using the stored corrected image-representing picture element values in an image-reproduction process to make the defect-free reproduction.

In some cases, it may be desirable to replace the individual values of a group of neighbouring picture elements containing an element with a sharply differing value, by the individual values of a group of picture elements in a neighbouring defect-free region, in order to preserve the "texture" of the appearance.

The area including the defect-containing region can be indicated by means of a cursor or light pen on a video monitor, on which a scanned picture is displayed.

In the preferred method embodying the invention, when a cursor or light pen has indicated on a video monitor an area containing a defect but including a defect-free region surrounding the defect, a computer examines the area region by region, working in from the boundary of the area and replacing defective picture element values when they are encountered, as described above.

Such a method eliminates the need for accuracy by the operator in locating the centre of a defective area.

Image-reproducing apparatus according to the invention includes a store for values for picture elements in an image to be reproduced, a display device for providing a display of the image represented by the said picture element values, and means for correcting defects in the image, and in which the correcting means comprises:

an indicating device for indicating an area of the displayed image within which there is a defect;

data processing means for ascertaining the range of the values of picture elements in a defect-free region neighbouring the defect-containing region in the said area, and for indicating when a picture element in a defect-containing region of the said area has a value differing sharply from the said range of values;

means generating new values for superseding the said sharply differing picture element values in the store, the new values being derived from values of picture elements or the average value of picture elements in the said neighbouring region, or from values having a similar mean value and similar variation to picture elements in the said neighbouring region;

and means responsive to the stored picture element values following such defect correction to treat an output surface and thereby to form a reproduction of the said image.

In order that the invention may be better understood, an example of a method embodying the invention will now be described with reference to the accompanying drawings, in which.

Figure 1:
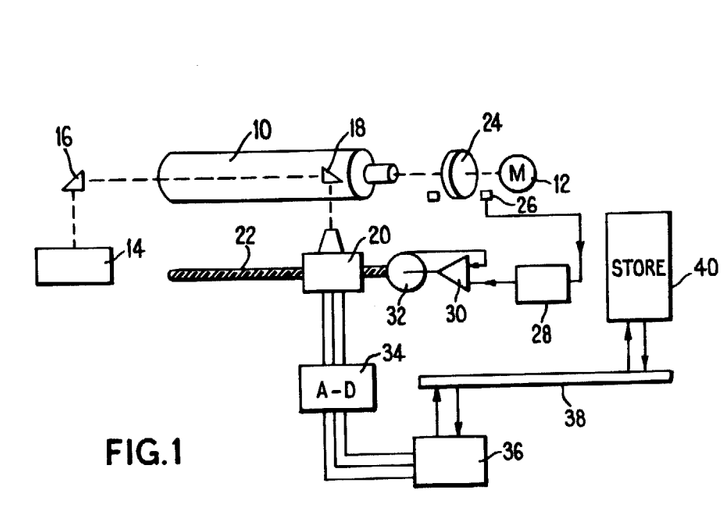
FIG. 1 shows the apparatus and circuits associated with analysing an original to derive and store image-representing signals for each picture element of the original.

In FIG. 1, an original (not shown) is wrapped around a transparent drum 10 driven by a motor 12. Light from a lamp within the housing 14 is reflected by a prism 16 and a prism 18 (within the drum 10), the reflected light passing through the transparent original and on to a photomultiplier in an analysing head 20. The head 20 is mounted on a lead screw 22 driven by a servo system under the control of a grating 24 and pick-up 26. The servo system comprises a control unit 28, a servo amplifier 30 and a servo motor 32.

Within the analysing head 20, the light falls on three photomultipliers after passing through three individual filters. As a consequence, three signals representing the red, blue and green components of the original are applied from the head through correcting circuits (not shown) to an analogue-to-digital converter 34. From the converter 34, the signals are applied through a controller 36 and a bus line 38 to a store 40.

Timing signals derived from the pick-up 26 are also applied to the controller 36 so that the controller can enter samples into store 40 at the required increments of drum rotation.

Figure 2:
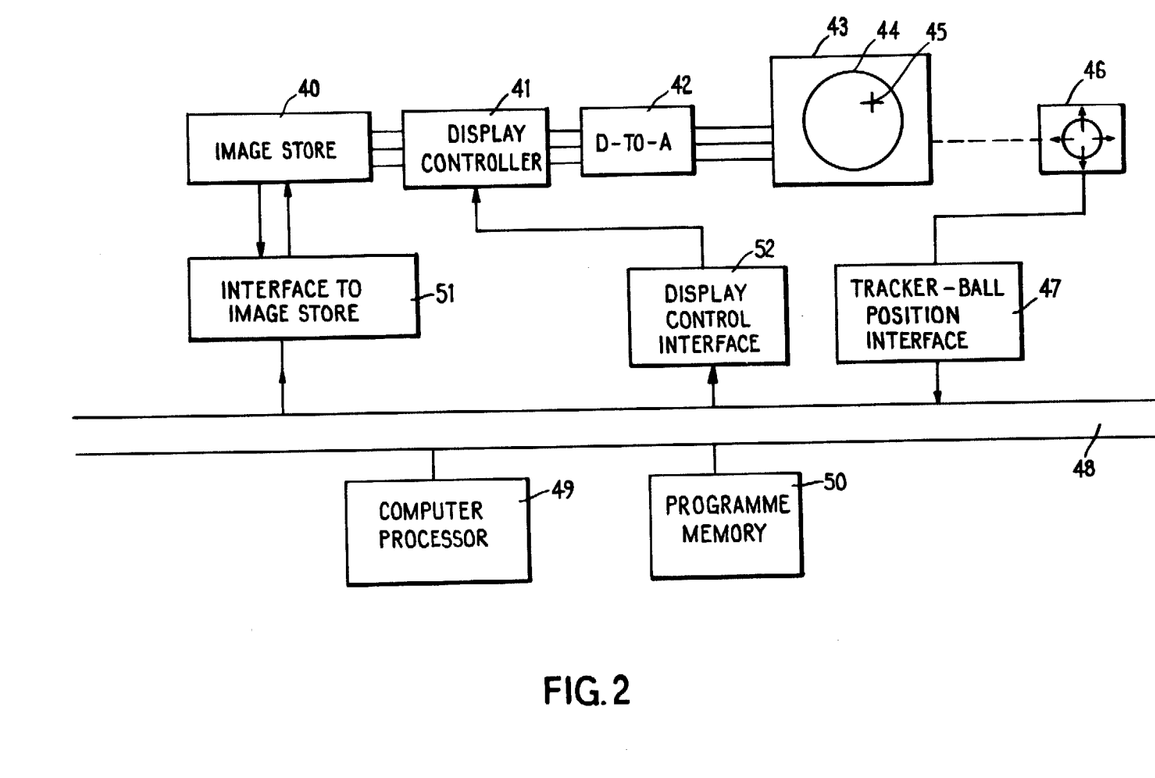
FIG. 2 illustrates a part of the apparatus used for defective signal replacement.

Referring now to FIG. 2, signals from the image store 40 are then applied to a display controller 41 and a digital-to-analogue converter 42 to a monitor 43 to provide a display on the screen 44 of a cathode ray tube. A cursor 45 is moved by a cursor position control 46 (for example a tracker ball) to indicate the location, or approximate location, of a defect in the display. Signals from the position control 46 are applied to a bus 48 by way of a tracker ball position interface 47.

A computer processor 49, operating under the control of the address signal and of the programme memory 50, addresses the store 40 through an interface 51 to derive values of picture elements just outside the defect-containing region, as will be explained in greater detail with reference to FIG. 4. Next, the computer processor addresses the store 40 to obtain the values of addresses just inside the defect-containing region and if it finds any signals which differ sharply from the expected range of values, it sends a replacement signal to the corresponding address in the store.

The bus 48 is also connected to the display controller 41 through the display control interface 52.

Figure 3:
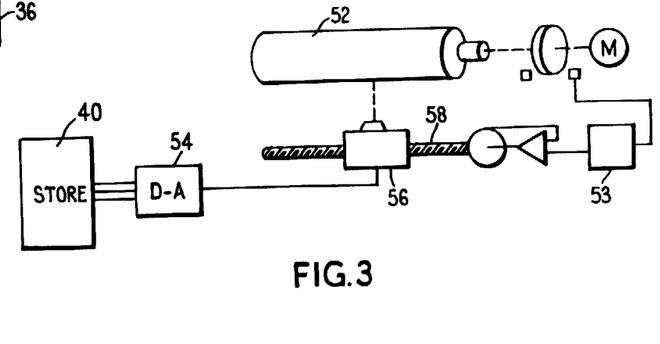
FIG. 3 illustrates the part of the apparatus used for making the reproduction from the stored defect-free signals.

Once all defect-representing signals have been replaced, the apparatus is used in the manner shown in FIG. 3. In FIG. 3, the materials which are to form the colour separations are wrapped around a drum 52; the exposures take place one at a time in the example described. Under the control of timing signals derived from a controller 53, signals from the store 40 are applied through a digital-to-analogue converter 54 and the resulting analogue signals for each colour in turn are used to modulate a light source in an exposing head 56, on the assumption that the separation is being formed by means of a light-sensitive paper. The head 56 is mounted on a lead screw 58 which is driven in the same manner as the lead screw 22 in FIG. 1.

Figure 4:
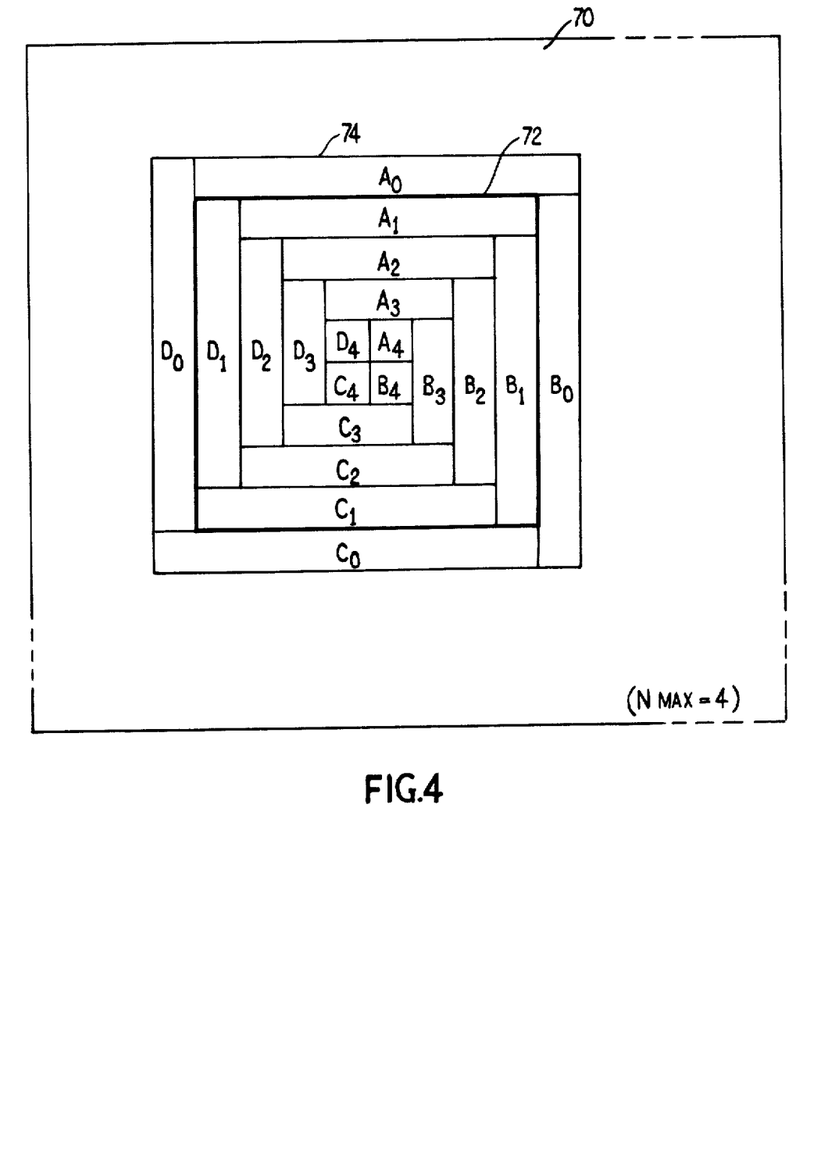
FIG. 4 shows a defect-containing area in a display, and the manner in which it is subdivided for treatment.

Turning now to FIG. 4, there is shown an image area defined by the boundary 70 on the monitor face and an area 72 (greatly enlarged) indicated by a heavy line, this being the area containing a defect. The area 72 is the maximum area within which correction can be achieved; in this case, it has a length of 8 picture elements in each direction. Also shown is a boundary 74 indicating an area which is larger by one picture element in each direction than the area 72.

Outside the area 72 and within the boundary 74 there are four peripheral regions Ao, Bo, Co, and Do. Inside the heavy line, the area 72 is sub-divided into lines of picture elements, the lengths of which decrease progressively towards the centre of the area.

Referring now to the flow diagram (FIG. 5), it will be assumed that the lines A0 to A4 are to be considered first. Then initially, in step 80, N is made equal to zero ($N_{max}=4$ in FIG. 4) and the statistical spread of picture element (pixel) values in the line A0 (FIG. 4) will be determined (step 81), and this is represented by P min to P max. In the next step 82, line A1 will be considered and a computer will determine whether all the picture element values in line A1 are within the range P min to P max. If the answer is "yes", then step 81 is repeated for line A1, that is to say the statistical spread of pixel values in line A1 is computed to give new values for P min to P max; this is achieved by adding one to the value of N (step 83) and if this does not give $N_{max}$ (step 83a) repeating step 81 for line A1. Thereafter step 82 is repeated for line A2.

Figure 5:
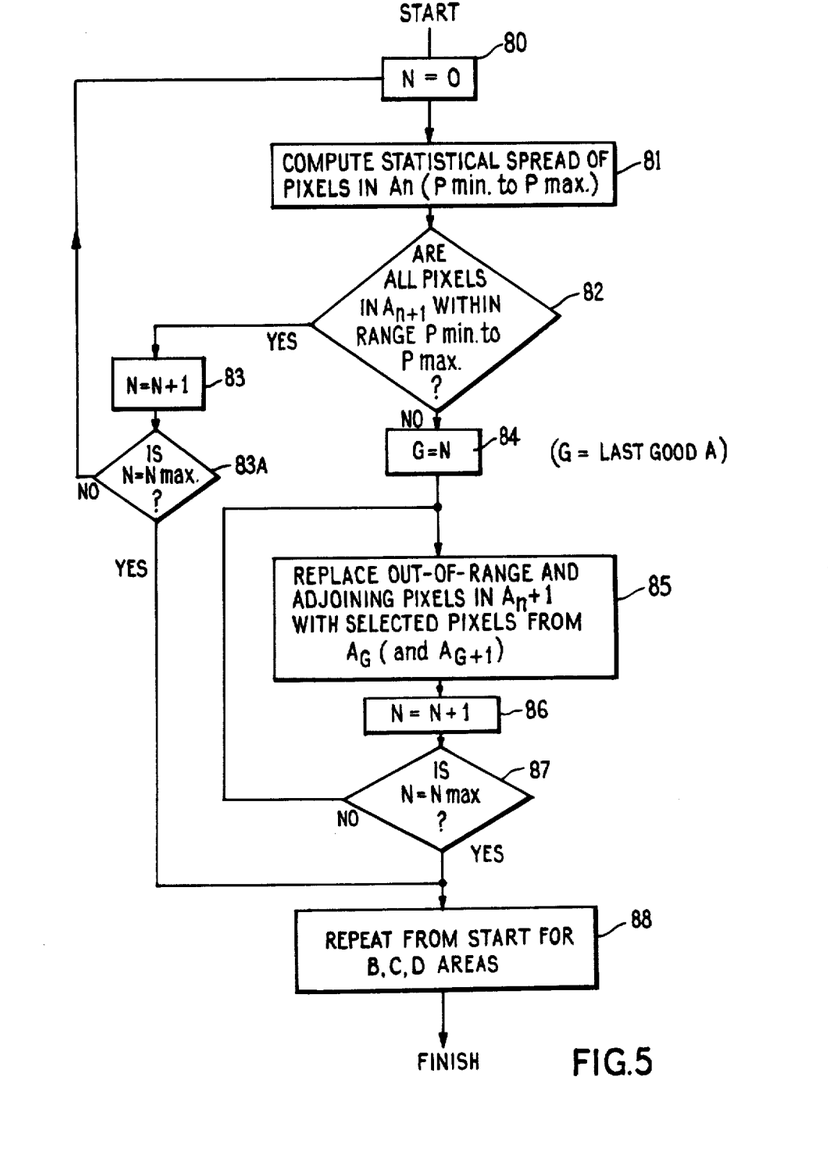
FIG. 5 is a flow diagram.

If however the answer to the question "are all pixel values in A1 within the range P min to P max?", is "no", then those pixel values which are outside the said range, and adjoining pixel values, are replaced with selected pixel values from the last good line, indicated in the flow diagram as $A_G$; this is represented by steps 84 and 85 of the diagram. Next, if the line under consideration is not the last of the A lines (steps 86 and 87), for example if line A1 has just been corrected, then the next of the A lines is subjected to step 85, i.e. for line A2 the out-of-range pixel values, and the values of adjoining pixels, are replaced with selected pixel values from the last good line. When all the A lines have been treated in this way, the process is repeated for the B, C and D sections of the area (step 88), again working from the boundary towards the centre.

The statistical spread computation (step 81) can be carried out in various ways. One of these, details of which can be obtained from books on statistics, comprises computing the variance and choosing x-percentile limits, i.e. limits such that x-percent of samples will lie outside these limits. The value of x may be 10%, for instance. In another simpler method, the largest and smallest values are obtained and the limits are calculated as: $P_{min}=$(smallest sample minus x); $P_{max}=$(largest sample $+x$)

The optimum value of x in this second method will depend on picture quality and may be for example 0.2 density units. An expansion of this portion 81 of the flow diagram is shown in FIG. 6, which uses yet another computation.

Figure 6:
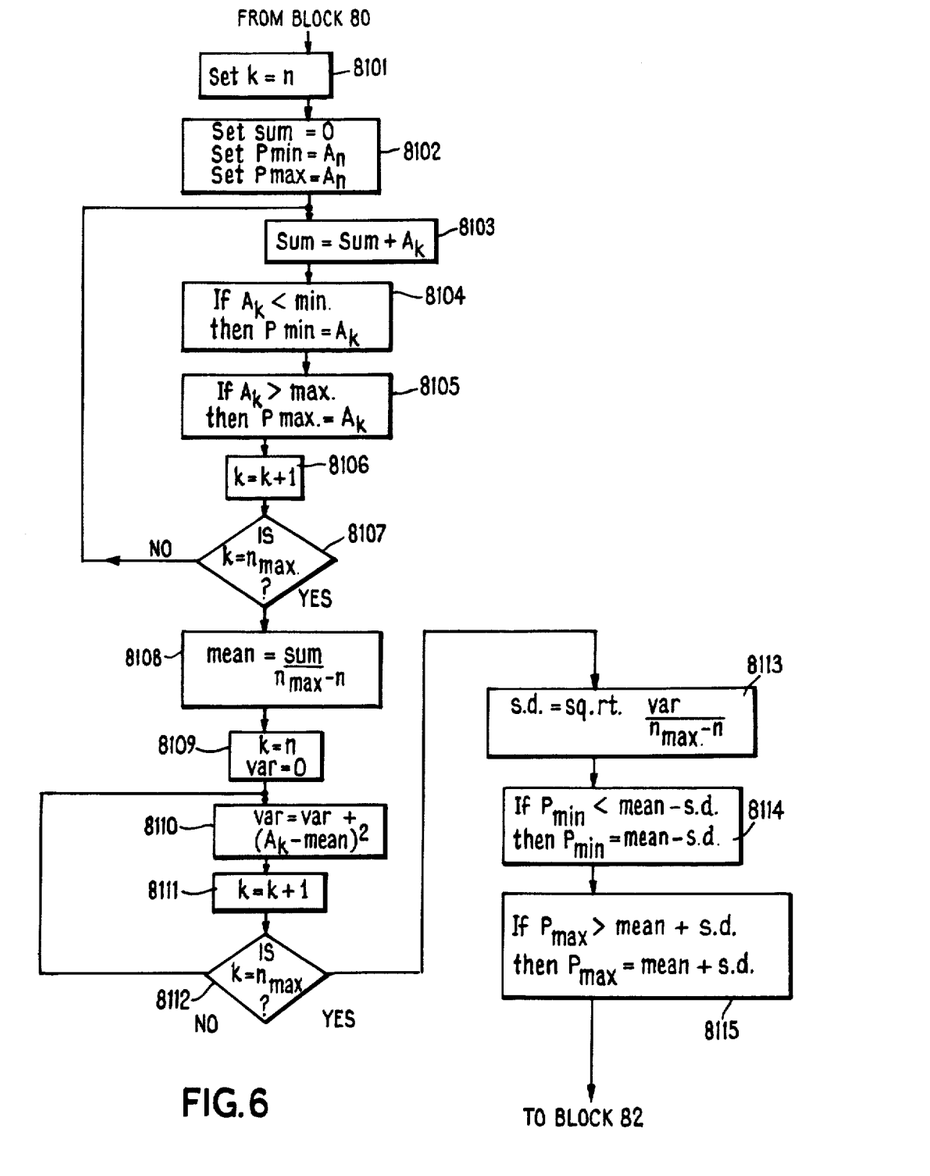
FIGS. 6 and 7 are expanded portions of steps in FIG. 5.

In FIG. 6, the pixel which is being considered at any moment is indicated by k. In the first step 8101, k is made equal to n, which is the number of the first pixel in the A line. In the next step 8102, the sum is made equal to zero, and both $P_{min}$ and $P_{max}$ are made equal to the value of $A_n$. In the next step 8103, the value $A_k$ is added to the preceding sum (in this case zero). In step 8104 if $A_k$ is less than the existing value of $P_{min}$, then $P_{min}$ is made equal to the value of $A_k$. Similarly in step 8105, if $A_k$ is greater than the existing value of $P_{max}$, then $P_{max}$ is made equal to the value of $A_k$. In step 8106, the value of k is increased by one and, on the assumption that this does not make k equal to the maximum value of n for the A line in question, steps 8103, 8104, 8105 and 8106 are repeated. In this way, for the elements in the segment of line A which is under consideration, there is established a sum, a minimum value and a maximum value.

Next, in step 8108 a mean value is obtained by dividing the sum by the number of pixels in this segment ($n_{max} - n$).

In step 8109, k is again made equal to n and a zero value is allocated to a variation factor. Step 8110 is in a further loop which calculates the variation from the previous value for variation plus $(A_k - \text{mean})^2$. In step 8111, the value of k is increased by 1 and step 8112 indicates that if this new value of k is not equal to $n_{max}$, steps 8110 and 8111 are repeated. In this way, the statistical variation is calculated for all the elements in the line segment.

Next, the standard deviation sd is calculated in step 8113 as the square root of the variation divided by the number of elements in the line segment.

Finally, in step 8114, if $P_{min}$ is less than the mean minus the standard deviation, $P_{min}$ is made equal to the mean minus the standard deviation. Similarly, in step 8115 if $P_{max}$ is greater than the mean plus the standard deviation, $P_{max}$ is made equal to the sum of the mean and the standard deviation.

Figure 7:
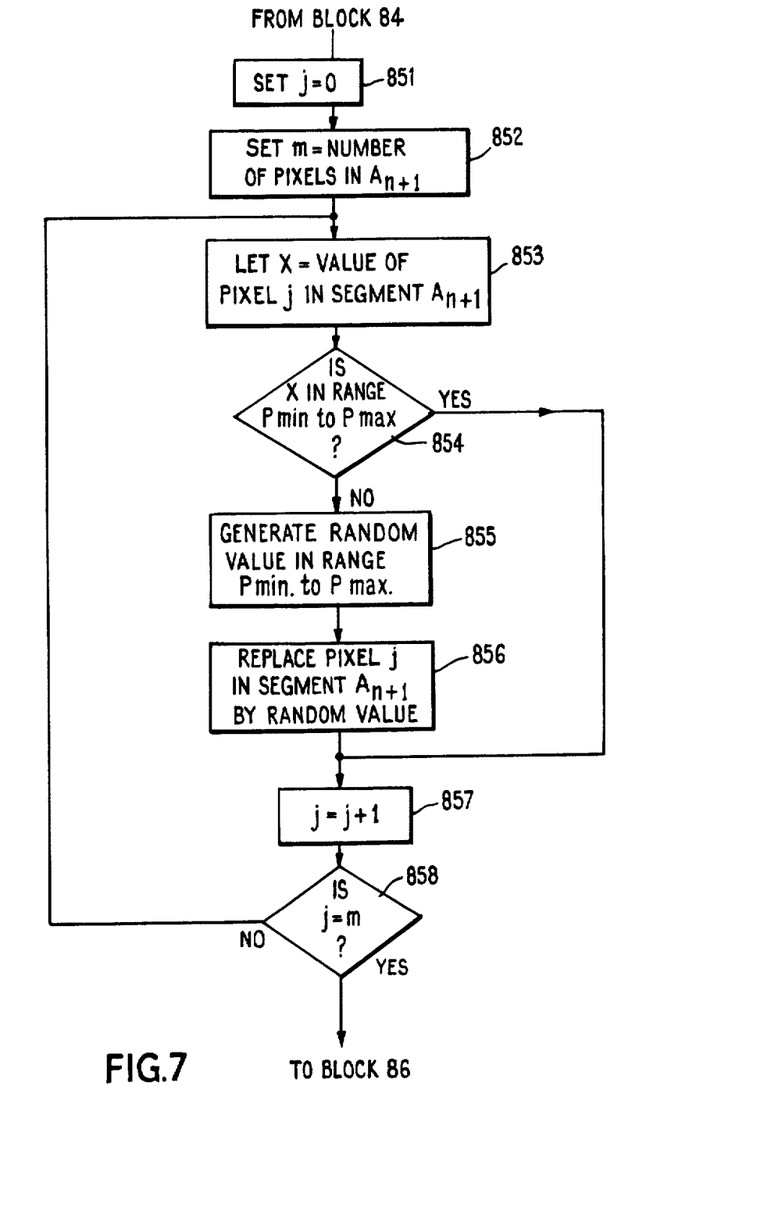

FIG. 7 is an expansion of the block 85 of FIG. 5.

In FIG. 7, in a first step a pixel number j is set to zero (step 851). In the next step 852, m is set to the number of pixels in line $A_{n+1}$. Then if x is given the value of pixel j in the line segment $A_{n+1}$ (step 853), the next stage is to ask whether x is in the range $P_{min}$ to $P_{max}$ (step 854). If it is not, then a random value in the range $P_{min}$ to $P_{max}$ is generated (step 855) and the value x of pixel j in segment $A_{n+1}$ is replaced by the random value (step 856).

If at step 854 it was ascertained that x was in the range $P_{min}$ to $P_{max}$, then the flow diagram proceeds directly to step 857 instead of by way of steps 855 and 856.

In step 857, the value of j is increased by 1 and it is determined whether the new value of j is equal to m, i.e. whether all pixels in the segment $A_{n+1}$ have been considered. If they have not, then the process is repeated from step 853 for the next pixel. If all pixels have been considered, then the flow diagram of FIG. 5 proceeds to step 86.

Instead of generating a random value in step 855, a replacement value might alternatively be derived from a systematic method of computation, for example by taking an average of pixels $j-1$, $j+1$ in segment $A_G$.

In the example shown in FIG. 4, the smallest areas to be considered are single picture element areas (A4, B4, C4, D4). If the area capable of correction is chosen to be a square with an odd number of picture elements as its side lengths, the smallest areas are each of two picture elements length, with an odd central picture element to which can be arbitrarily assigned the value of an adjoining picture element.

To summarize, in the example which has been described, the correction computer starts from a boundary of the indicated area and shrinks this boundary in, side by side, until a marked change of picture element value is found, indicating that the edge of the defect has been reached. When deviant picture element values are found, these values are replaced by typical values taken in some structured manner from the last good line of picture elements. The replacement value is not constant but maintains some statistical properties of the surrounding picture elements to avoid a flat appearance. Then replacement of picture elements adjacent to the defective picture elements reduces the possibility of a "ghost" of the defect remaining because picture elements next to an aberrant picture element may themselves show a bias towards the defect value. For the same reason, the replacement values may be obtained from a line slightly further from the defect than the last good line. Again, it is possible, on discovering a defect value, to replace a block of four picture elements, including two from the preceding line, by a block of four picture elements taken at random from preceding good lines, to preserve a "structure" or texture in the appearance.

In computing the spread of picture element values, for a colour image, it is possible to use only luminance values; alternatively, the consideration may extend to the values of individual colour components, e.g. magenta and cyan values. As an example, any picture element whose magenta value was outside the probability range for magenta (say 90%), or any picture element whose cyan value was similarly outside the 90% probability range for cyan, would be regarded as aberrant.

Although we prefer to work inward from the boundary of the indicated defect-containing area, other methods are possible; it would, for example, be possible to start within the defective area itself and work outward until an edge was located, and then to carry out defect replacement by taking as a background value some function of the values of the picture elements surrounding the defect. In this method the sequence is to work outwards until a "good" area is reached i.e. no further rapid change of value is encountered; then to note the statistical spread of the elements in the "good" area; and finally to replace the values of elements in the "bad" area with values derived from the "good" area.

As another example of determining the statistical spread of picture element values in a line, one may select a property, for instance luminance, and determine the average value a and a "spread" value s, such that the limits $a \pm s$ enclose 90% of the pixel values, for example, for that line. Then a defective picture element value in the defect-containing region is one falling outside the range $a \pm ks$. The value of k is selected according to the circumstances and may be, for example 1.5.

Then the defective values, and the values of pixels adjoining the defective pixel or pixels, are replaced by values of luminance distributed within the range $a \pm s$.

It is possible to detect defective pixels using luminance values. When defective pixels are detected, both luminance and chromaticity values are replaced by those from the surrounding area.

I claim:

1. A method of making a defect-free reproduction of an image, comprising:

storing signal values for all picture elements of the image to be reproduced;

identifying picture elements for which the signal values are defective;

and replacing each stored defective value of a picture element by a value derived from a neighbouring picture element; and in which the replacement is effected by:

for an area smaller than the image, which area has been indicated as including a defect-containing region, comparing the image values of picture elements in a region of the said area, but outside the defect-containing region, to ascertain the range of the values of picture elements in a defect-free region in the neighbourhood of the defect-containing region;

examining image values for picture elements in the defect-containing region by comparing them with the said range of values to ascertain whether any such picture element has a value differing sharply from the said range of values;

for any picture element having a sharply differing value, automatically replacing the said value by the value of a neighbouring picture element in the defect-free region;

thereafter, examining the values of other picture elements in the defect-containing region and similarly automatically replacing those which differ sharply from the range of values in the neighbouring defect-free region until the whole of the defect-containing region has been examined;

and using the stored corrected image-representing picture element values in an image-reproduction process to make the defect-free reproduction.

2. A method in accordance with claim 1 in which, in the said replacement, individual values of a group of neighbouring picture elements containing an element with a sharply differing value are replaced by the individual values of a group of picture elements in a neighbouring defect-free region, whereby the texture of the appearance is preserved.

3. A method in accordance with claim 1, in which the signal values for the picture elements of the image are used to form a display of the image on a video monitor and the defect-containing area is indicated by means of a cursor or light pen.

4. A method according to claim 1, 2 or 3, in which the range of picture element values is derived from picture elements outside and adjoining the defect-containing region and the picture elements of the defect-containing region are examined portion by portion, working in from the boundary of the defect-containing region and replacing defective picture element values when they are encountered.

5. Image-reproducing apparatus, including a store for values of picture elements in an image to be reproduced, a display device for providing a display of the image represented by the said picture element values, and means for correcting defects in the image, and in which the correcting means comprises:

an indicating device for indicating an area of the displayed image within which there is a defect, said area being smaller than the image;

data processing means for ascertaining the range of the values of picture elements in a defect-free region neighbouring the defect-containing region in the said area, and for indicating when a picture element in a defect-containing region of the said area has a value differing sharply from the said range of values;

means generating new values for superseding the said sharply differing picture element values in the store, the new values being derived from values of picture elements in said neighbouring region;

and means responsive to the stored picture element values following such defect correction to treat an output surface and thereby to form a reproduction of the said image.

6. Image-reproducing apparatus in accordance with claim 5, in which said new values are derived from the average value of picture elements in said neighbouring region.

7. Image-reproducing apparatus in accordance with claim 5, in which said new values are derived from values having a similar means value and similar variation to picture elements in said neighbouring region.

8. A method of making a defect-free reproduction of an image, comprising:

obtaining signal values for all picture elements of the image to be reproduced;

identifying picture elements for which the signal values are defective;

and replacing the defective value of a picture element by a value derived from a group of neighbouring picture elements; and in which the replacement is effected by:

for an area of the image which is smaller than the image and which has been indicated as including a defect-containing region, comparing the image values of picture elements in a region of the said area, but outside the defect-containing region, to ascertain the range of the values of picture elements in a defect-free region in the neighbourhood of the defect-containing region;

examining image values for picture elements in the defect-containing region by comparing them with the said range of values to ascertain whether any such picture element has a value differing sharply from the said range of values;

for any picture element having a sharply differing value, automatically replacing the said value by the average value of a group of neighbouring picture elements in the defect-free region;

thereafter, examining the values of other picture elements in the defect-containing region and similarly automatically replacing those which differ sharply from the range of values in the neighbouring defect-free region until the whole of the defect-containing region has been examined;

and using the stored corrected image-representing picture element values in an image-reproduction process to make the defect-free reproduction.

9. A method of making a defect-free reproduction of an image, comprising:

obtaining signal values for all picture elements of the image to be reproduced;

identifying picture elements for which the signal values are defective;

and replacing the defective value of a picture element by a value derived from a group of neighbouring picture elements; and in which the replacement is effected by:

for an area of the image which is smaller than the image and which has been indicated as including a defect-containing region, comparing the image values of picture elements in a region of the said area, but outside the defect-containing region, to ascertain the range of the values of picture elements in a defect-free region in the neighbourhood of the defect-containing region;

examining image values for picture elements in the defect-containing region by comparing them with the said range of values to ascertain whether any such picture element has a value differing sharply from the said range of values;

for any picture element having a sharply differing value, automatically replacing the values of such picture elements by values having a similar mean value and similar variation to those in the neighbouring defect-free region;

thereafter, examining the values of other picture elements in the defect-containing region and similarly automatically replacing those which differ sharply from the range of values in the neighbouring defect-free region until the whole of the defect-containing region has been examined;

and using the stored corrected image-representing picture element values in an image-reproduction process to make the defect-free reproduction.

10. A method according to claim 1, 8 or 9, in which the examination of the image values for picture elements in the defect-containing region is effected by comparing image values of picture elements within and at the boundary of the defect-containing region with the said range of values; and, after the said automatic replacement, examining the values of other picture elements in the defect-containing region, adjacent to the boundary elements previously examined, and similarly automatically replacing those which differ sharply from the range of values in the nearest defect-free region, and continuing to examine the values of picture elements within and further from the boundary until the whole of the defect-containing region has been examined.

11. A method according to claim 10 in which said boundary is formed by the four sides of a rectangle, and in which the examination of the image values in the defect-containing region takes place in successively shorter lines of picture elements parallel to the sides of said rectangle and in the direction from each of said sides to the center of said rectangle.

12. A method according to claim 10, in which the boundary of the defect-containing region has a number of sides, and in which the examination of picture element values within the said region takes place from each side in turn, in each case the examination proceeding from the side towards the middle of the defect-containing region.

* * * * *